United States Patent
Masumoto et al.

(10) Patent No.: US 9,035,257 B2
(45) Date of Patent: May 19, 2015

(54) HUMAN BODY SENSING DEVICE AND IMAGE FORMING APPARATUS HAVING THE SAME

(75) Inventors: Kosuke Masumoto, Toyokawa (JP); Shiro Umeda, Toyokawa (JP); Toshiaki Tanaka, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 237 days.

(21) Appl. No.: 13/425,794

(22) Filed: Mar. 21, 2012

(65) Prior Publication Data

US 2012/0241625 A1    Sep. 27, 2012

(30) Foreign Application Priority Data

Mar. 25, 2011    (JP) ................................. 2011-067080

(51) Int. Cl.
*G01J 5/02*       (2006.01)
*G01S 3/787*      (2006.01)
*G08B 13/19*      (2006.01)
*G08B 13/193*     (2006.01)
*G08B 13/189*     (2006.01)

(52) U.S. Cl.
CPC ............... *G01S 3/787* (2013.01); *G08B 13/189* (2013.01); *G08B 13/19* (2013.01); *G08B 13/193* (2013.01)

(58) Field of Classification Search
CPC .... G08B 13/189; G08B 13/193; G08B 13/19; F21V 23/0414; G01J 5/00; G01J 5/0022
USPC ........... 250/338.1, 340, 342, 358.1, 221, 353, 250/347; 340/541, 565, 600
See application file for complete search history.

(56) References Cited

U.S. PATENT DOCUMENTS

| | | | |
|---|---|---|---|
| 2006/0146142 A1* | 7/2006 | Arisawa et al. | 348/211.11 |
| 2008/0002396 A1* | 1/2008 | Sandell | 362/147 |
| 2009/0084957 A1* | 4/2009 | Chi et al. | 250/338.3 |
| 2010/0012016 A1* | 1/2010 | Viala | 116/75 |

FOREIGN PATENT DOCUMENTS

JP    06-059036 A    3/1994

* cited by examiner

*Primary Examiner* — Yara B Green
(74) *Attorney, Agent, or Firm* — Buchanan Ingersoll & Rooney PC

(57) ABSTRACT

A human body sensing device comprises: an infrared sensor which detects a human body; a rotatable group of lenses having a plurality of lenses arranged around the sensor, the lenses being configured to: generate unit sensing zones defined by a sensing distance extending radially outwardly from the group and a small width extending in a rotation direction of the group; and form a plurality of alternating layers of a regional sensing zone including one or more than one of the unit sensing zones and a non-sensing zone not including any of the unit sensing zones, in a rotation direction of the group; a rotary drive which rotates the group; a rotation position sensor which detects a rotation position of the group; and a recognizer which recognizes the location and/or movement of a human body based on the output level indicated by the infrared sensor and the rotation position.

19 Claims, 15 Drawing Sheets

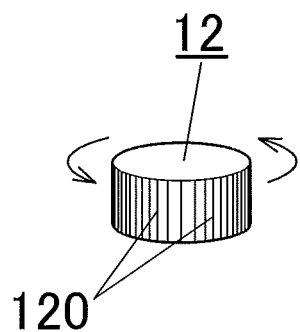 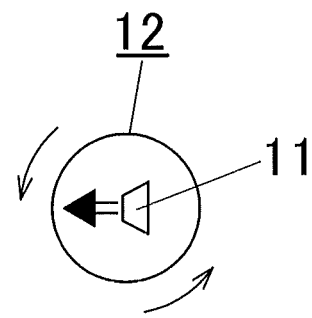
FIG.2A  FIG.2B
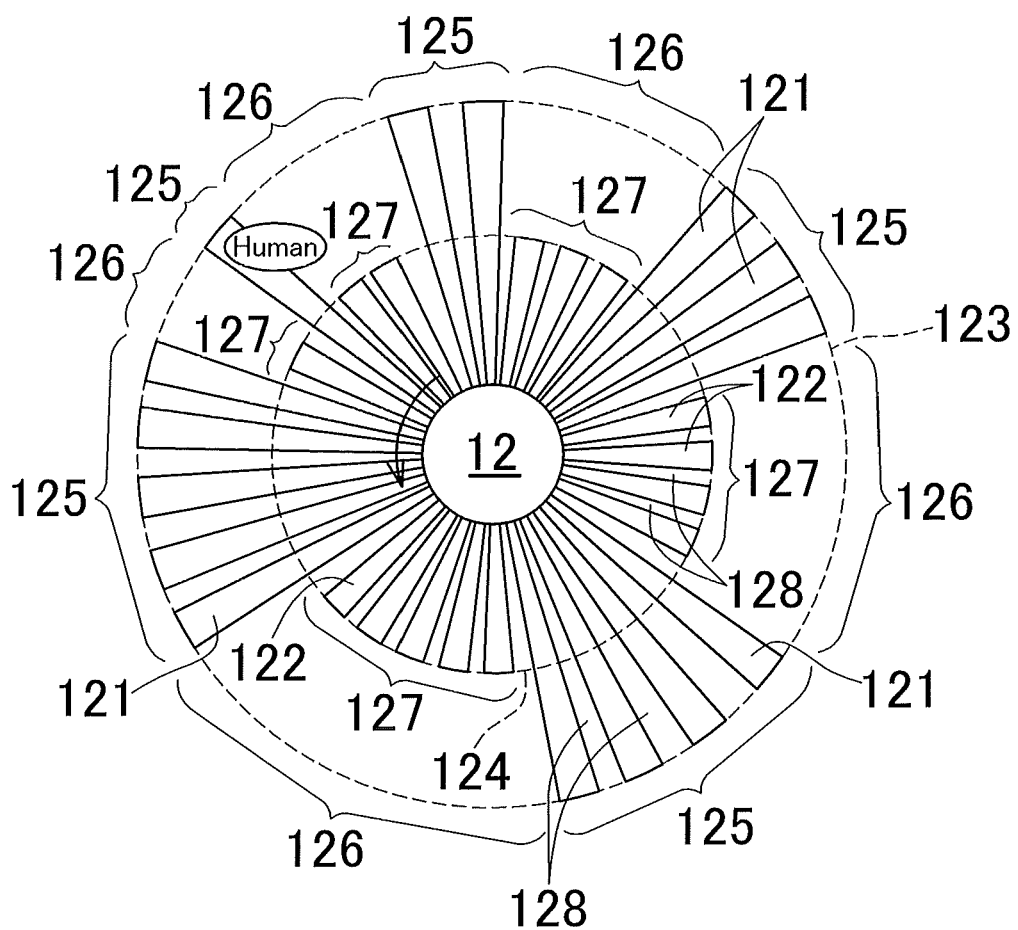
FIG.3

The waveform indicated when the human body is taking a pause

The waveform indicated when the human body is moving in the negative rotation direction of the group of lenses

| Direction of Movement | Output Level | Time to Complete One Cycle | Results |
|---|---|---|---|
| F1 | Raised | It takes more time to complete one cycle | Recognize that the human body is getting near the sensor in the positive rotation direction |
| F2 | Lowered | It takes more time to complete one cycle | Recognize that the human body is moving away from the sensor in the positive rotation direction after passing through the front of the sensor |
| F3 | Raised | It takes less time to complete one cycle | Recognize that the human body is getting near the sensor in the negative rotation direction |
| F4 | Lowered | It takes less time to complete one cycle | Recognize that the human body is moving away from the sensor in the negative rotation direction after passing through the front of the sensor |

HUMAN BODY SENSING DEVICE AND IMAGE FORMING APPARATUS HAVING THE SAME

This application claims priority under 35 U.S.C. §119 to Japanese Patent Application No. 2011-067080 filed on Mar. 25, 2011, the entire disclosure of which is incorporated herein by reference in its entirety.

BACKGROUND OF THE INVENTION

1. Field of the Invention

The present invention relates to a human body sensing device capable of identifying the location and/or movement of a human body and an image forming apparatus with such a human body sensing device being installed thereon.

2. Description of the Related Art

The following description sets forth the inventor's knowledge of related art and problems therein and should not be construed as an admission of knowledge in the prior art.

Some of the image forming apparatuses such as copiers, printers, and facsimiles, and some of the multifunctional digital image forming apparatuses referred to as MFPs (Multi Function Peripherals) collectively having copier, printer, and facsimile functions and the like are provided with a human body sensing device for sensing a human body moving toward themselves, so that they immediately can exit sleep mode to get back to normal operation mode for a warm-up operation when a human body is moving toward themselves.

For example, there commonly known is a human body sensing device consisting of a pyroelectric infrared sensor with an energy-saving and low-cost configuration, capable of performing human body sensing.

It is advantageous for such a pyroelectric infrared sensor, if it is installed on the ceiling, to detect a human body on the floor; the pyroelectric infrared sensor is very good at detecting a human body moving across the sensing zone based on a change in temperature over there. To the contrary, it is not so advantageous for such a pyroelectric infrared sensor, if it is installed on the image forming apparatus, to detect a human body (a user) moving toward the image forming apparatus with the intention to use it; the pyroelectric infrared sensor is not very good at detecting a human body moving against the front direction of the pyroelectric infrared sensor itself based on a change in temperature in the sensing zone, because such a change is always too small. In this case, from which direction a human body enters the sensing zone and whether or not a human body is taking a pause cannot be recognized.

To avoid this trouble, Japanese Patent Application H06-059039 discloses a technology to identify the location of a human body by rotating a ring-shaped shield plate with through-holes, which is provided outside of a sensor, about the axis of the sensor.

However, the technology disclosed in the publication above can detect a human body who is in the sensing zone of the sensor but cannot identify the location and/or movement of the human body accurately, for example whether toward or away from the sensor the human body is moving.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

In a first aspect, the present invention of the subject application relates to a human body sensing device comprising:

an infrared sensor which detects a human body based on a change in infrared energy;

a rotatable group of lenses consisting of a plurality of first lenses arranged around the infrared sensor in a circular pattern, the first lenses being configured to:

generate first unit sensing zones defined by a first sensing distance extending radially outwardly from the group of lenses and a small width extending in a rotation direction of the group of lenses; and form a plurality of alternating layers of a first regional sensing zone including one or more than one of the first unit sensing zones and a non-sensing zone not including any of the first unit sensing zones, in a rotation direction of the group of lenses;

a rotary drive which rotates the group of lenses about the axis of the infrared sensor;

a rotation position sensor which detects a rotation position of the group of lenses rotated by the rotary drive; and a recognizer which recognizes the location and/or movement of a human body which is in a first sensing zone defined by the first sensing distance, extending radially outwardly from the group of lenses, based on the output level indicated by the infrared sensor while the group of lenses is being rotated by the rotary drive and the rotation position detected by the rotation position sensor.

In a second aspect, the present invention of the subject application relates to a human body sensing device comprising:

an infrared sensor which detects a human body based on a change in infrared energy;

a rotatable group of lenses consisting of a plurality of first and second lenses arranged around the infrared sensor in a mixed manner in a circular pattern, the first lenses being configured to generate first unit sensing zones defined by a first sensing distance extending radially outwardly from the group of lenses and a small width extending in a rotation direction of the group of lenses, while the second lenses generate second unit sensing zones defined by a second sensing distance shorter than the first sensing distance, extending radially outwardly from the group of lenses and a small width extending in a rotation direction of the group of lenses;

a rotary drive which rotates the group of lenses about the axis of the infrared sensor; and a recognizer which recognizes the location and/or movement of a human body which is in a first sensing zone defined by the first sensing distance, extending radially outwardly from the group of lenses, or in a second sensing zone defined by the second sensing distance, based on the output level indicated by the infrared sensor while the group of lenses is being rotated by the rotary drive.

In a third aspect, the present invention of the subject application relates to an image forming apparatus comprising a human body sensing device, the human body sensing device being provided with:

an infrared sensor which detects a human body based on a change in infrared energy;

a rotatable group of lenses consisting of a plurality of first lenses arranged around the infrared sensor in a circular pattern, the first lenses being configured to:

generate first unit sensing zones defined by a first sensing distance extending radially outwardly from the group of lenses and a small width extending in a rotation direction of the group of lenses; and form a plurality of alternating layers of a first regional sensing zone including one or more than one of the first unit sensing zones and a non-sensing zone not including any of the first unit sensing zones, in a rotation direction of the group of lenses;

a rotary drive which rotates the group of lenses about the axis of the infrared sensor;

a rotation position sensor which detects a rotation position of the group of lenses rotated by the rotary drive; and a recognizer which recognizes the location and/or movement of a human body which is in a first sensing zone defined by the first sensing distance, extending radially outwardly from the group of lenses, based on signals outputted from the infrared sensor while the group of lenses is being rotated by the rotary drive and the rotation position detected by the rotation position sensor.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 2A is a perspective view of a group of lenses; FIG. 2B is a plain view of the same;

FIG. 3 is a top view of the group of lenses constituting a pattern, to explain the sensing zone of the sensor which is formed by the group of lenses;

FIG. 17 is a table including the algorithms to identify the location of a human body which is moving straight within the sensing zone of the sensor;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, a mode of implementing the present invention will be described with reference to the accompanying drawings.

Figure 1:
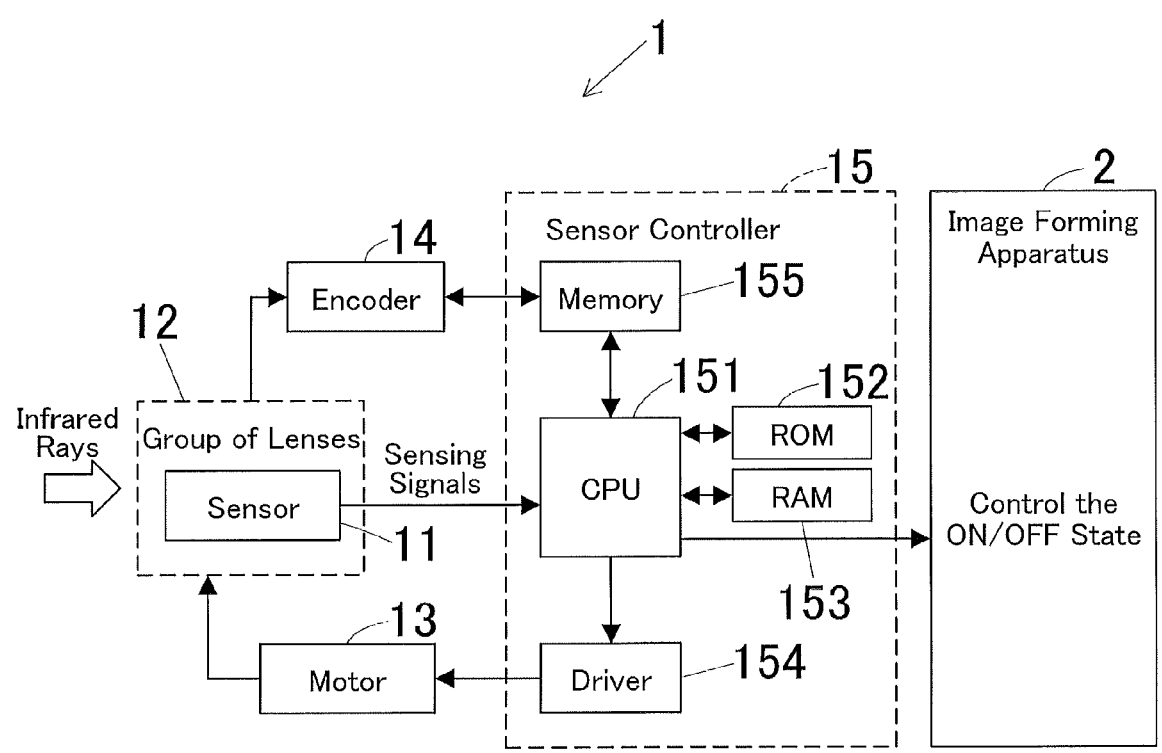
FIG. 1 is a block diagram illustrating a configuration of a human body sensing device according to one mode of implementing the present invention.

FIG. 1 is a block diagram illustrating a configuration of a human body sensing device according to one mode of implementing the present invention. In this mode of implementation, a human body sensing device 1 is installed on an image forming apparatus 2 such as a MFP as described above.

The human body sensing device 1 is provided with a human body sensing portion (hereinafter also will be referred to as 'sensor' in a simple manner) 11, a group of lenses 12, a motor 13, an encoder 14, and a sensor controller 15.

The sensor 11 consisting of a pyroelectric infrared sensor with an energy-saving and low-cost configuration, capable of performing human body sensing, produces an output in response to a change in temperature when a human body enters the sensing zone of the sensor 11.

The group of lenses 12 forms sensing zones for the sensor 11. The group of lenses 12 consisting of a plurality of lenses 120 arranged around the sensor 11 in a circular pattern as illustrated in FIG. 2A, is shaped in a cylindrical form whose opposing ends are firmly closed, and positioned at the inner center of the group of lenses 21 with its sensing side being faced to the left (being faced with the front side of the image forming apparatus 2) for example as illustrated in FIG. 2B.

The motor 13 rotates the group of lenses 12 about the axis of the sensor 11, specifically in this mode of implementation, in the counterclockwise direction in the plainer view of FIGS. 2A and 2B.

The encoder 14 detects a rotation position of the group of lenses 12 based on the amount of the movement of the group of lenses 12.

The sensor controller 15, which is provided with a CPU 151, a ROM 152, a RAM 153, a driver 154, a memory 155, and the like, controls the human body sensing device 1.

The CPU 151 controls the human body sensing device 1 by performing processing according to operation programs stored on the ROM 152 or another recording medium. Specifically, the CPU 151 controls the rotary condition of the group of lenses 12 by the driver 154 and the motor 13; records the rotation position of the group of lenses 12 detected by the encoder 14, on the memory 155; judges whether or not a human body enters the sensing zone of the sensor 11 based on the output of the sensor 11 and/or the rotation position of the group of lenses 12; and transmits the judgment result to the image forming apparatus 2. If the human body enters the sensing zone of the sensor 11, the CPU 151 further recognizes the location and/or movement of the human body based on the same then transmits information of the recognized location and/or movement of the human body, to the image forming apparatus 2.

Based on the judgment result and/or the information of the recognized location and/or movement of the human body, which are received from the human body sensing device 1, the image forming apparatus 2 goes into normal operation mode or sleep mode by switching the power ON or OFF.

The ROM 152 is a memory storing operation programs for the CPU 151 and the like; the RAM 153 is a memory sharing work areas for the CPU 151 to perform processing according to operation programs stored thereon.

The driver 154 is a driver circuit driving the motor 13.

The memory 155, which consists of a hard disk drive for example, records information such as a rotation position of the group of lenses 12 sensed by the encoder 14.

FIG. 3 is a top view of the group of lenses 12 constituting a pattern, to explain the sensing zone of the sensor 11 which are formed by the group of lenses 12.

In this mode of implementation, the group of lenses 12 includes a plurality of first lenses with a first sensing distance and a plurality of second lenses with a second sensing distance. These first lenses form first unit sensing zones 121 extending radially outwardly from the group of lenses 12; and these second lenses from second unit sensing zones 122 extending radially outwardly from the group of lenses 12.

Each of the first unit sensing zones 121 and each of the second unit sensing zones 122 have the sensing distance extending radially from the group of lenses 12 and the small width extending in a rotation direction of the group of lenses 12; the sensing distance of the first unit sensing zones 121 (the first sensing distance) is set to be larger than that of the second unit sensing zones 122 (the second sensing distance). By the presence of the first unit sensing zones 121 and the second unit sensing zones 122 as described above, a circular-form first sensing zone 123 extending the first sensing distance from the group of lenses 12 is formed externally outwardly from the group of lenses 12 to be the sensing zone of the sensor 11; and a circular-form second sensing zone 124 extending the second sensing distance from the group of lenses 12 is further formed in the first sensing zone 123. There is a viewing angle of the sensor 11; and the sensing zone of the sensor 11 is actually defined by the viewing angle of the sensor 11, the first sensing zone 123, and the second sensing zone 124.

It should be understood that the first and second lenses do not need to have the same sensing distance and the first lenses may have slightly different sensing distances among themselves while the same is true for the second lenses.

The first lenses are arranged around the group of lenses 12 in a circular manner so as to form a plurality of alternating layers of a first regional sensing zone 125 including one or more than one of the first unit sensing zone 121 and a non-sensing zone 126 not including any of the first unit sensing zone 121, in a rotation direction of the group of lenses 12.

In this mode of implementation, the first regional sensing zones 125 include the first unit sensing zones 121 whose numbers are changed in a regular manner in a rotation direction of the group of lenses 12. That is, the first regional sensing zones 125 include the first unit sensing zones 121 whose numbers are changed in an orderly manner: 1, 2, 3, 4, and 5, in the negative rotation direction of the group of lenses 12 as indicated by an arrow in FIG. 3.

And the second unit sensing zones 122 are intensively formed in the non-sensing zones 126 to constitute the second regional sensing zones 127. The second regional sensing zones 127 include the second unit sensing zones 122 whose numbers are also changed in an orderly manner: 1, 2, 3, 4, and 5, in the negative rotation direction of the group of lenses 12. Therefore space intervals (angles) are formed between the non-sensing zones 126, becoming gradually larger in the negative rotation direction of the group of lenses 12.

The first and second lenses are arranged in a circumferential direction of the group of lenses 12 with a tiny space interval between them; therefore tiny non-sensing zones 128 are formed between the first unit sensing zones 121 and the second unit sensing zones 122 included in each of the first regional sensing zones 125 and the second regional sensing zones 127, respectively.

The group of lenses 12 is rotated by the motor 13 about the axis of the sensor 11 inside of the group of lenses 12, in the counterclockwise rotation direction as illustrated in FIG. 3.

Figure 4:
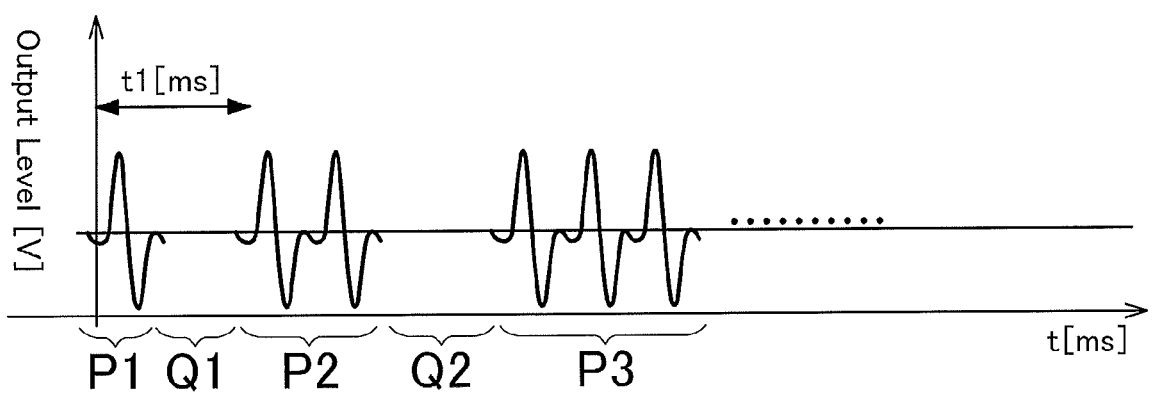
FIG. 4 is a view illustrating a waveform indicated by the sensor when a human body exists at a certain position in a first sensing zone but not in a second sensing zone.

Meanwhile, a human body is getting near the sensor 11 to move through a position in the first sensing zone 123 but not in the second sensing zone 124, which is indicated in FIG. 3. FIG. 4 is a chart of a waveform indicated by the sensor 11 in such a particular situation.

That is, a human body moves through one of the first regional sensing zones 125, including one first unit sensing zone 121. In response to this movement of the human body, the sensor 11 outputs sensing signals to indicate one cycle of the waveform, which is illustrated as the part P1 in the chart of FIG. 4. When the group of lenses 12 makes another rotation, the human body moves through one of the non-sensing zones 126, not including any of the first unit sensing zones 121. Not sensing any changes within the sensing distance of the second unit sensing zones 122, the sensor 11 does not produce an output only to indicate an inactive period of the waveform, which is illustrated as the part Q1 in the chart of FIG. 4.

When the group of lenses 12 makes still another rotation, the human body moves through one of the first regional sensing zones 125, including two first unit sensing zones 121. In response to this movement of the human body, the sensor 11 outputs sensing signals to indicate two cycles of the waveform, which is illustrated as the part P2 in the chart of FIG. 4.

In this way above, while the group of lenses 12 is kept rotated, the sensor 11 indicates one to five cycles of the waveform at an interval during an inactive period according to the following routine: one cycle of the waveform (P1); inactive period (Q1); two cycles of the waveform (P2); inactive period (Q2); three cycles of the waveform (P3); inactive period (Q3) . . . five cycles of the waveform (P5); and inactive period (Q5), starting all over again from one cycle of the waveform (P1).

On the other hand, the CPU 151 identifies the rotation position of the group of lenses 12 based on the amount of the movement of the group of lenses 12, which is counted by the encoder 14. And the CPU 151 further identifies the location of the human body based on the rotation position of the group of lenses 12 and the waveform indicated by the sensor 11.

Subsequently, while the group of lenses 12 is kept rotated, a human body further enters the second sensing zone 124, more specifically, a human body moves through one of the second regional sensing zones 127, including a certain number of the second unit sensing zones 122 formed in one of the non-sensing zones 126. In response to this movement of the human body, the sensor 11 outputs sensing signals to indicate cycles of the waveform as many as the number of the second unit sensing zones 122 during the inactive periods Q1 and Q2 in the chart of FIG. 4.

Figure 5:
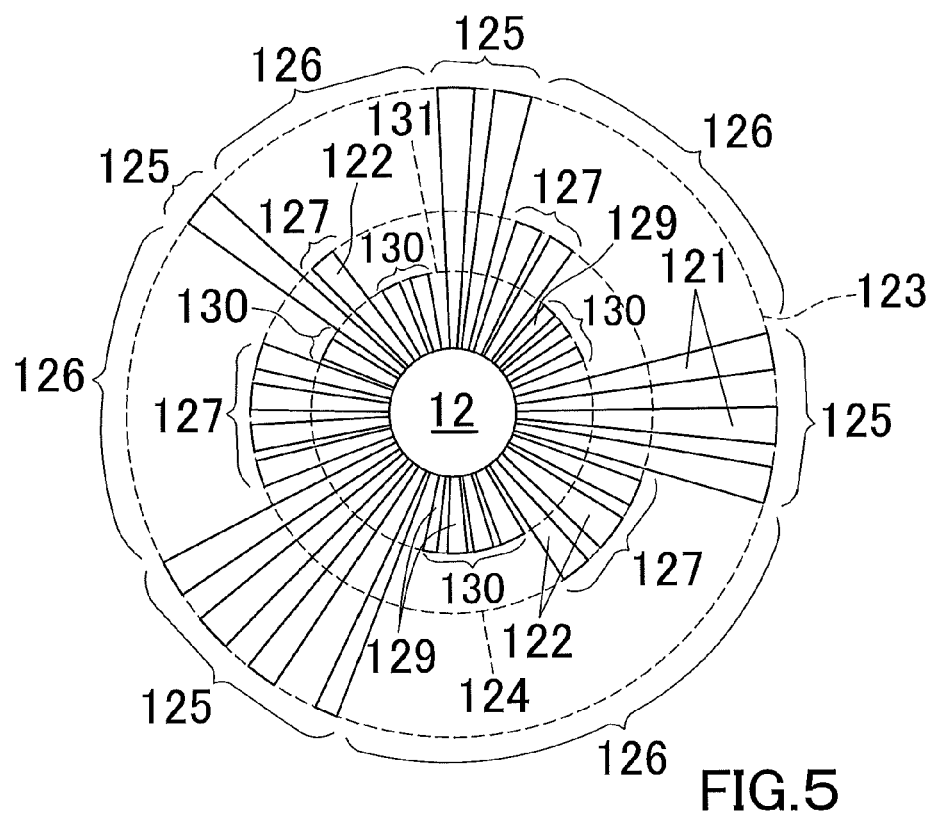
FIG. 5 is a top view of a group of lenses constituting a pattern, to explain that the number of unit sensing zones is increased one by one in the negative rotation direction of the group of lenses.

In this mode of implementation as illustrated in FIG. 3, two types of lenses with different sensing distances from each other form two types of unit sensing zones: the first unit sensing zones 121 and the second sensing zones 122, and also two types of sensing zones: the first sensing zone 123 and the second sensing zone 124. Alternatively, as illustrated in FIG. 4, three types of lenses with different sensing distances from each other may form three types of unit sensing zones: first unit sensing zones 121, second unit sensing zones 122, and third unit sensing zones 129, and also three types of sensing zones: a first sensing zone 123, a second sensing zone 124, and a third sensing zone 131. In FIG. 5, the number 130 indicates third regional sensing zones formed in the third unit sensing zones 129.

Furthermore, in this mode of implementation, the number of the first unit sensing zones 121 included in one first regional sensing zone 125 and the number of the second unit sensing zones 122 included in one second regional sensing zone 127 are increased from one to five in the negative rotation direction of the group of lenses 12, and the sensor 11 indicates different numbers of cycles of the waveform accordingly. This makes it possible to identify the location and movement of a human body accurately.

Figure 6:
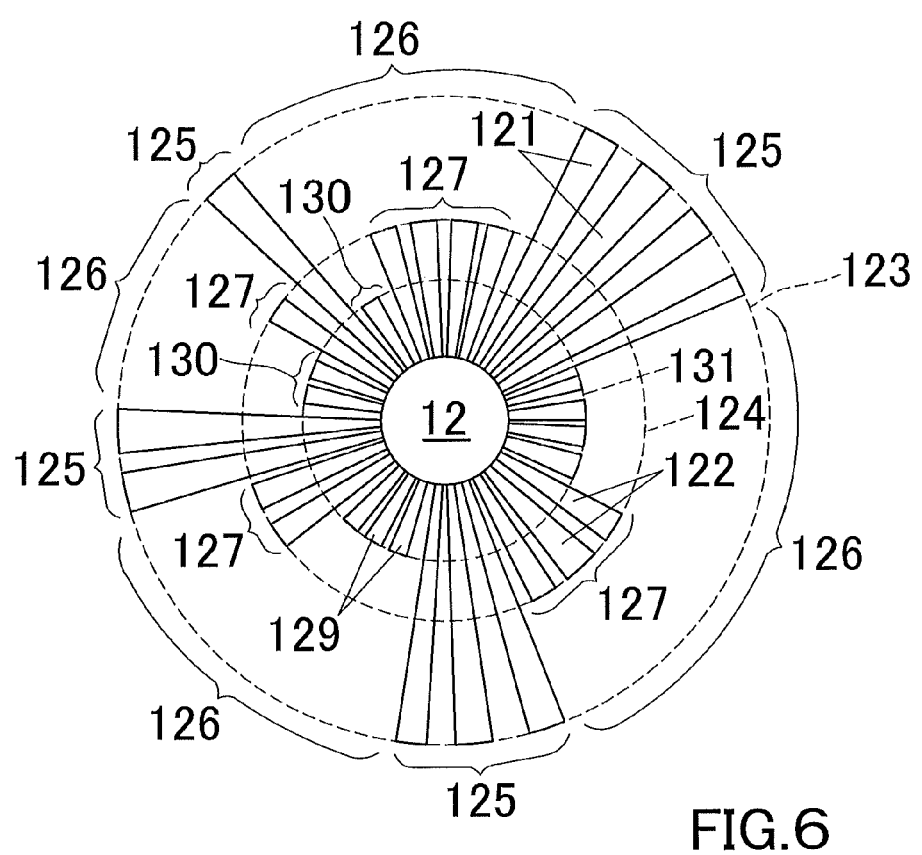
FIG. 6 is a top view of a group of lenses constituting a pattern, to explain that the number of unit sensing zones is increased one by one in the positive rotation direction of the group of lenses.

Alternatively, as illustrated in FIG. 5, the number of the first unit sensing zones 121 formed in one first regional sensing zone 125 and the number of the second unit sensing zones 122 formed in one second regional sensing zones 127 may be increased one by one in the negative rotation direction of the group of lenses 12 (the group of lenses 12 is rotated in the counterclockwise rotation direction), and as illustrated in FIG. 6, these numbers may be increased one by one in the positive rotation direction of the group of lenses 12. Meanwhile, the number of the third unit sensing zones 129 may be increased one by one in the negative rotation direction of the group of lenses 12 as illustrated in FIG. 5, and in the positive rotation direction of the group of lenses 12 as illustrated in FIG. 6.

Figure 7:
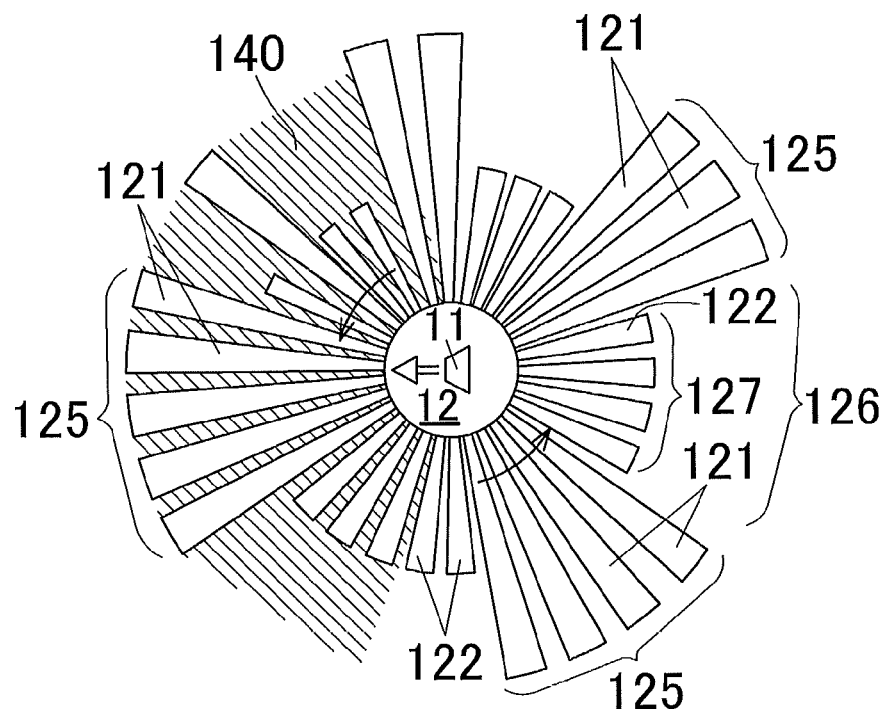
FIG. 7 is a top view of a group of lenses constituting a pattern, with the viewing angle of the sensor.
Figure 8:
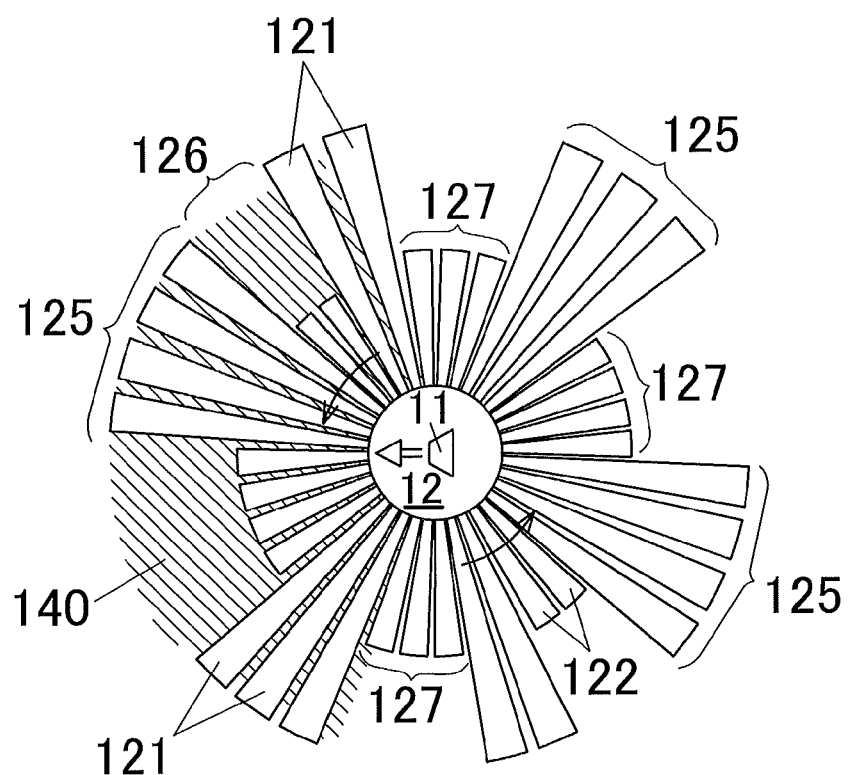
FIG. 8 is a top view of a group of lenses constituting another pattern, with the viewing angle of the sensor.

It is necessary that the numbers of the first unit sensing zones 121, the second unit sensing zones 122, and the third unit sensing zones 129 should be increased in the manner as described above, at least in the viewing angle 140 of the sensor 11 as indicated by linear shadow in FIG. 7. This is because the sensor 11 is capable of fulfilling its own function only in the viewing angle 140. For example, in the case as illustrated in FIG. 8, as long as there are not at least in the viewing angle 140, any of the first regional sensing zones 125 including the first unit sensing zones 121 whose numbers are the same or any of the second regional sensing zones 127 including the second unit sensing zones 122 whose numbers are the same, the sensor 11 fulfills its own function as in the case where the first regional sensing zones 125 including the first unit sensing zones 121 whose numbers are all different or the second sensing zones 127 including the second unit sensing zones 122 whose numbers are all different.

Figure 9:
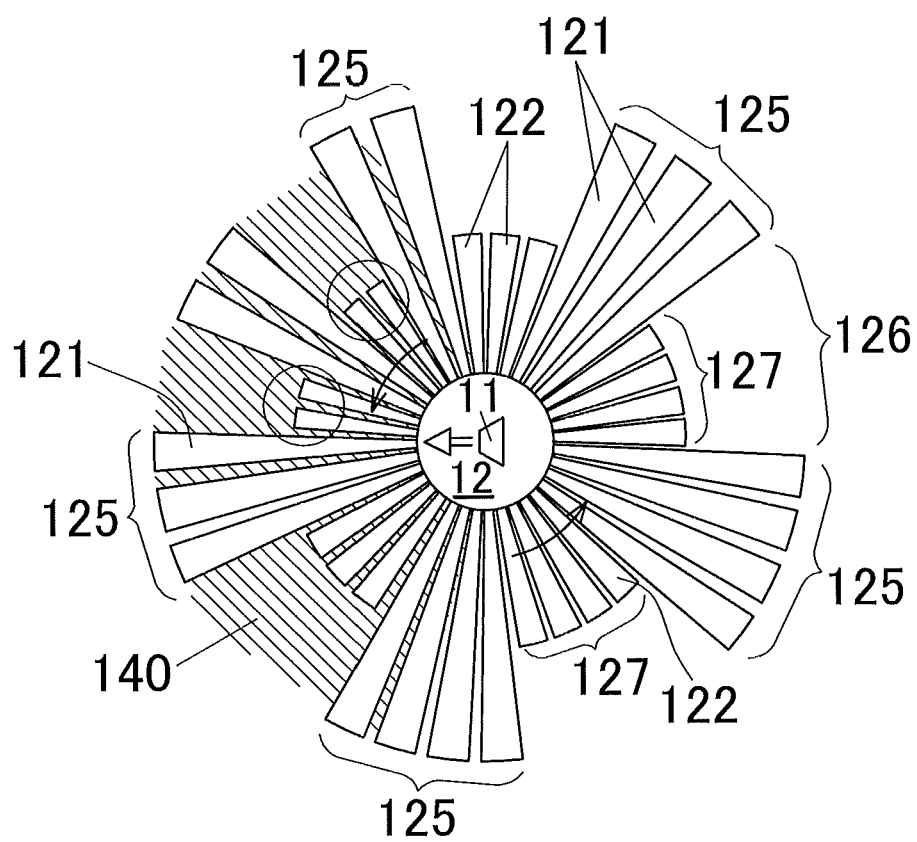
FIG. 9 is a top view of a group of lenses constituting a pattern, to explain that a plurality of regional sensing zones include the same number of unit sensing zones.

On the other hand, in the case as illustrated in FIG. 9, if there are in the viewing angle 140, any of the first regional sensing zones 125 including the first unit sensing zones 121 whose number are the same or any of the second regional sensing zones 127 including the second unit sensing zones 122 are the same, the sensor 11 outputs sensing signals repeating the same pattern, which makes it difficult to identify the location of a human body accurately.

Hereinafter, a human body sensing algorithm executed by the sensor controller 15 will be described in detail.

Figure 10A:
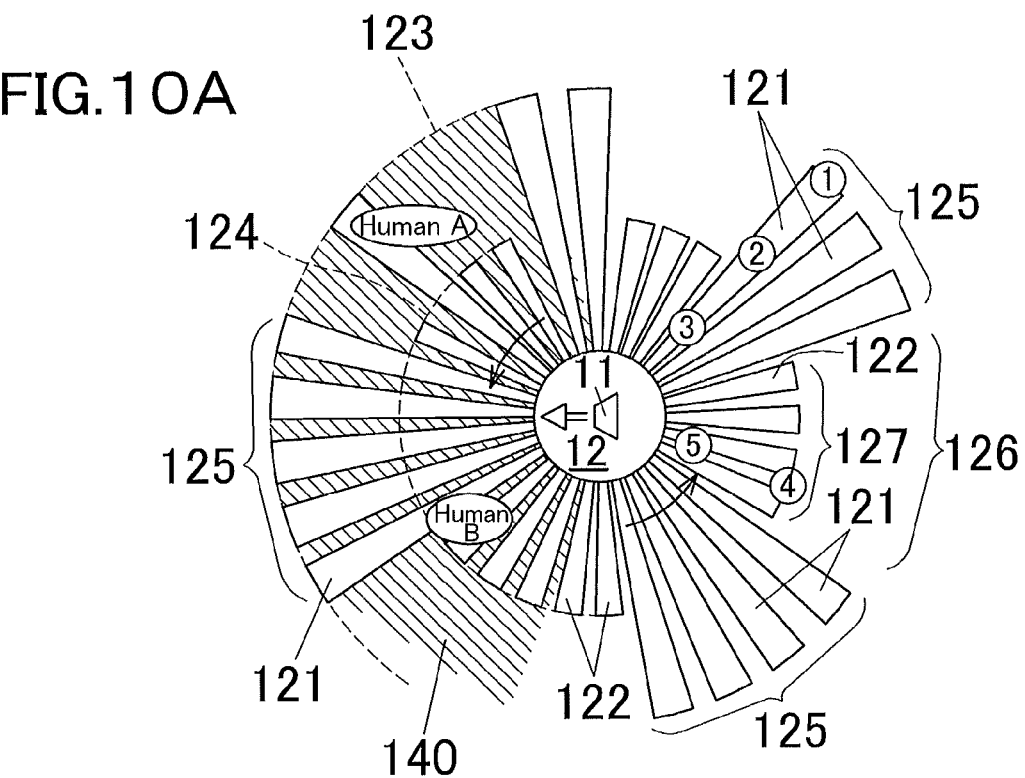
FIG. 10A is a top view of a group of lenses constituting a pattern when a human body is in the sensing zone of the sensor within the viewing angle of the sensor.

Here is an example where a human body A is in the first sensing zone 123 but not in the second sensing zone 124, within the viewing angle 140 of the sensor 11, as illustrated in FIG. 10A.

Figure 10B:
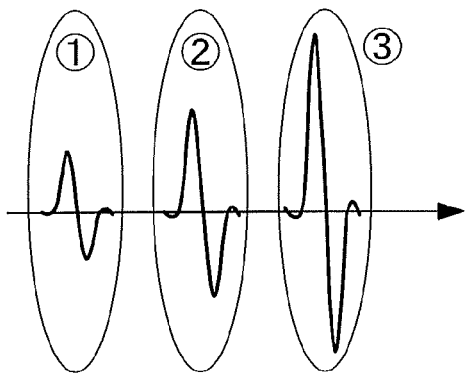
FIGS. 10B and 10C are views each illustrating a waveform indicated by the sensor when a human body is detected at different positions.
Figure 10C:
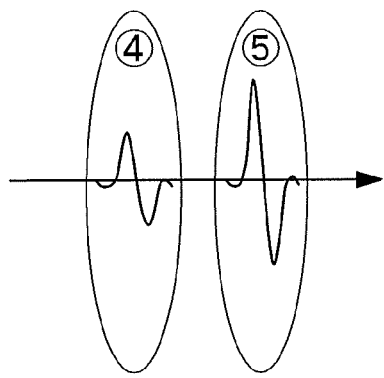
Figure 11A:
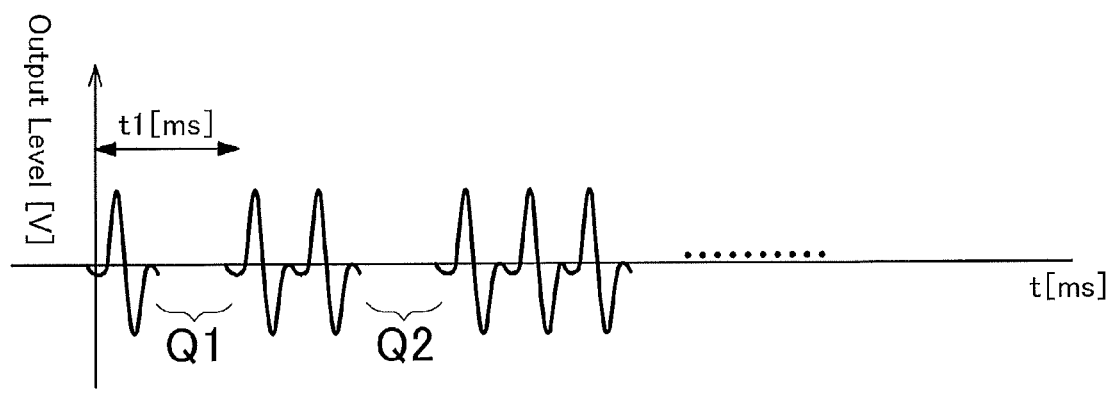
FIG. 11A is a view illustrating a waveform due to a human body A of FIG. 10A.

FIG. 11A represents the output produced by the sensor 11 in such an example. And it is understood from FIGS. 10B and 10C that the output level of the sensor 11 becomes higher as the human body approaches the sensor 11. The cycles of the waveform with the circled numbers 1-3 in FIG. 10B are caused when the human body exists at the locations with the same circle numbers in one of the first unit sensing zones 121 in FIG. 10A; and the cycles of the waveform with the circled numbers 4-5 in FIG. 10C are caused when the human body exists at the locations with the same circle numbers in one of the second unit sensing zones 122 in FIG. 10A.

And it is recognized that the human body A is in the first sensing zone 123 but not in the second sensing zone 124 because there are inactive periods Q1 and Q2 in the waveform of FIG. 11A. And the distance of the sensor 11 to the human body A is determined based on the output level. Furthermore, the direction that the human body A is moving to is determined based on the number of cycles per one waveform and the rotation position (amount of the movement) of the group of lenses 12. For example, it is possible to determine the direction that the human body A is moving to based on the fact that as many as two cycles of the waveform are caused within the time t1[ms] after the start of rotation. In this way described above, the location of the human body A has been identified.

And here is an example where a human body B is in the second sensing zone 124 within the viewing angle 140 of the sensor 11, as illustrated in FIG. 10A.

Figure 11B:
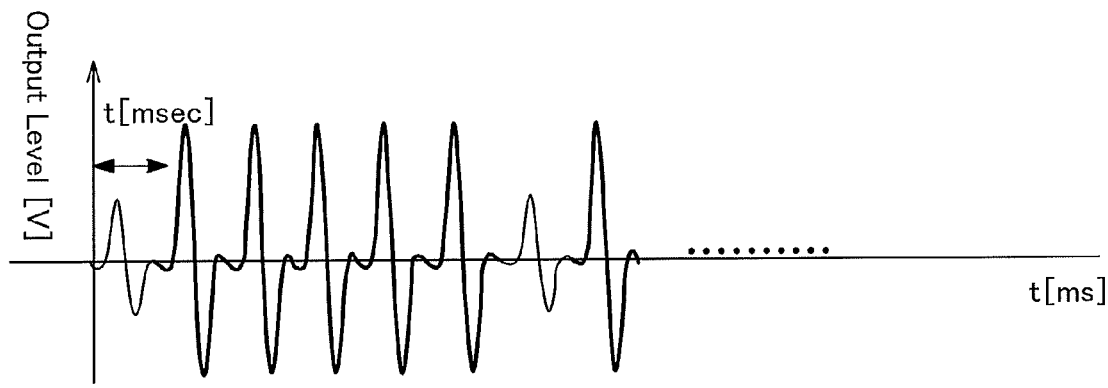
FIG. 11B is a view illustrating a waveform due to the presence of a human body B of FIG. 10A.

FIG. 11B represents the output produced by the sensor 11 in such an example. It is recognized that the human body B is in the second sensing zone 124 because there are the higher amplitude cycles (indicated by heavy line) related to the first regional sensing zone 125 and the lower amplitude cycles (indicated by thin line) related to the second regional sensing zones 127, while there are no inactive periods in the waveform. And the direction that the human body B is moving to is determined based on the fact that as many as five cycles of the waveform are caused within the time t[ms] after the start of rotation. In this way described above, the location of the human body B has been identified.

Furthermore, here is an example where both the human body A and the human body B are at their locations at the same time. While the waveform indicated by the sensor 11 will be the sum of those of FIGS. 11A and 11B in this example, the output due to the presence of the human body B which is closer to the sensor 11 than the human body A is dominantly produced and the location of the human body B is preferentially identified. The location of the human body B is identified in the same way as described above.

Hereinafter, an algorithm to recognize that a human body is moving toward the sensor 11 will be described.

Figure 12:
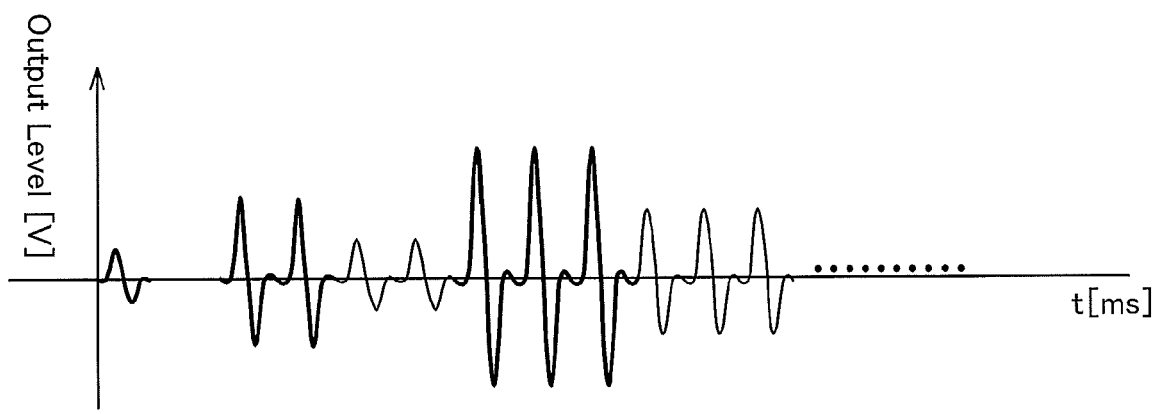
FIG. 12 is a view illustrating a waveform indicated by the sensor when the human body A of FIG. 10A is moving toward the sensor.

For example, the human body A of FIG. 10A is moving toward the sensor 11. FIG. 12 illustrates the waveform indicated by the sensor 11 in such a case.

The location of the human body A is identified based on the waveform in the same way as in the aforementioned cases of FIG. 11. It is recognized that the human body A is moving toward the sensor 11 because the output level of the higher amplitude cycles (indicated by heavy line) related to the first regional sensing zones 125 gradually becomes higher. It is also recognized that the human body A enters the second sensing zone 124 because there are the lower amplitude cycles (indicated by thin line) related to the second regional sensing zones 127. This makes it possible to identify the location of the human body A accurately.

Similarly, if the output level of the higher amplitude cycles gradually becomes lower, it is recognized that the human body A is moving away from the sensor 11; and if the output level of the higher amplitude cycles stays unchanged, it is recognized that the human body A is taking a pause.

Figure 13:
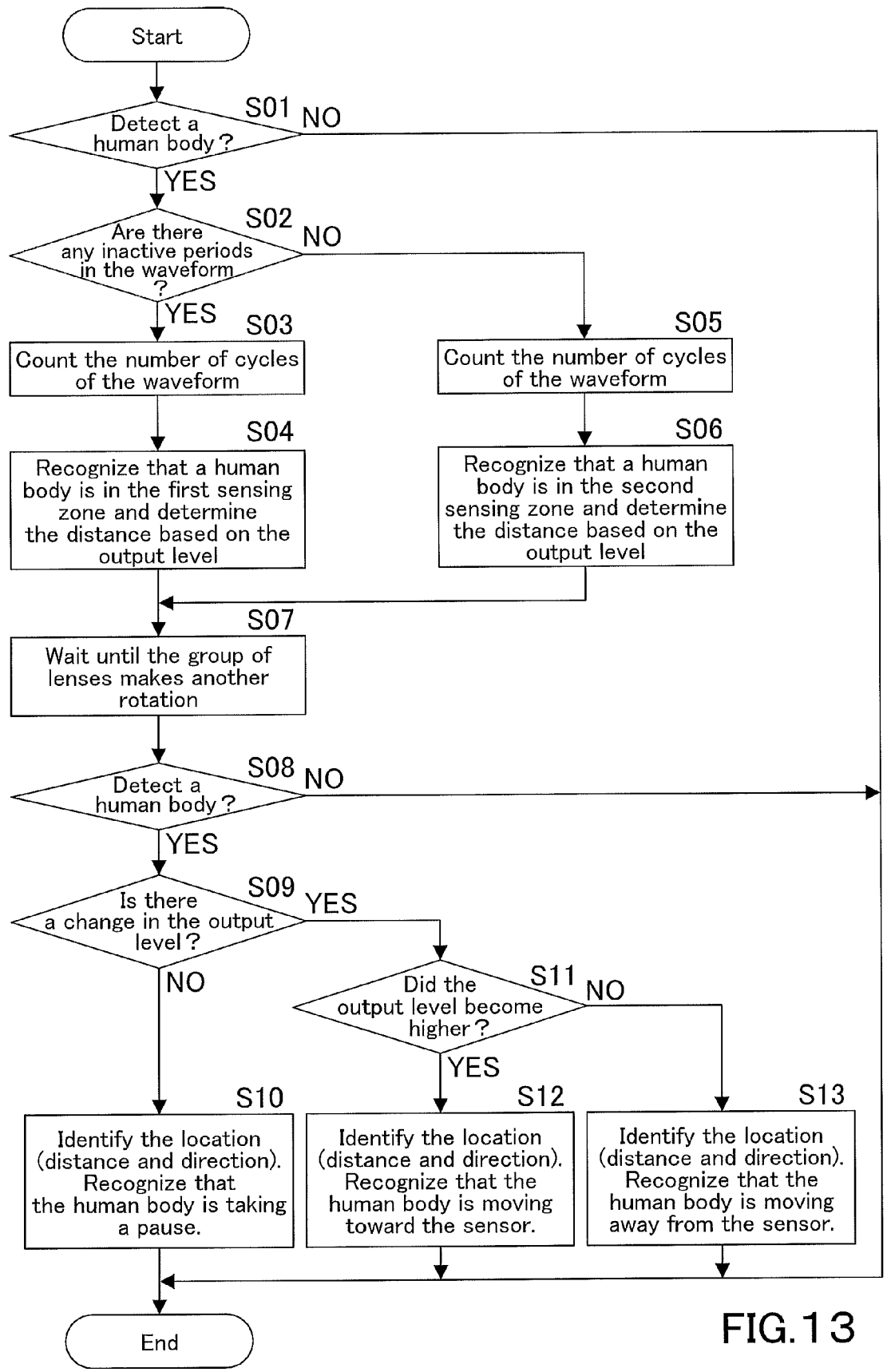
FIG. 13 is a flowchart representing a human body sensing operation to be performed according to a sensor controller.

FIG. 13 is a flowchart to explain the procedure for human body sensing as described above, which is executed by the sensor controller 15. The procedure is executed by the CPU 151 according to an operation program stored on the program ROM 152 or another recording medium.

In Step S01, it is judged whether or not a human body is detected, in other words, sensing signals are transmitted to the sensor 11. If no human body is detected (NO in Step S01), the processing routine terminates. If a human body is detected (YES in Step S01), then it is judged in Step S02 whether or not there are any inactive periods related to the non-sensing zones 126 in the waveform.

If there are any inactive periods in the waveform (YES in Step S02), the number of cycles of the waveform is counted in Step S03. And in Step S04, it is recognized that a human body is in the first sensing zone 123 and the distance of the sensor 11 to the human body is determined based on the output level. Then the processing routine proceeds to Step S07.

If there are not any inactive periods in the waveform (NO in Step S02), the number of cycles of the waveform is counted in Step S05. And in Step S06, it is recognized that a human body is in the second sensing zone 124 and the distance of the sensor 11 to the human body is determined based on the output level. Then the processing routine proceeds to Step S07.

In Step S07, the processing routine waits until the group of lenses 12 makes another rotation. And in Step S08, it is further judged whether or not a human body is detected.

If no human body is detected (NO in Step S08), it is recognized that the human body has moved out of the sensing zone and the processing routine terminates. If a human body is detected (YES in Step S08), then it is judged in Step S09 whether or not there is a change in the output level. If there is no change in the output level (NO in Step S09), the processing routine proceeds to Step S10 in which: the distance of the sensor 11 to the human body and the direction that the human body is moving to are determined; the location of the human body is identified; and it is recognized that the human body is taking a pause.

In Step S09, if there is a change in the output level (YES in Step S09), then it is judged in Step S11 whether or not it means that the output level becomes higher. If it means that the output level becomes higher (YES in Step S11), the processing routine proceeds to Step S12 in which: the distance of the sensor 11 to the human body and the direction that the human body is moving to are determined; the location of the human body is identified; and it is recognized that the human body is moving toward the sensor 11. If it does not mean that the output level becomes higher (NO in Step S11), the processing routine proceeds to Step S13 in which: the distance of the sensor 11 to the human body and the direction that the human body is moving to are determined; the location of the human body is identified; and it is recognized that the human body is moving away from the sensor 11.

Figure 14:
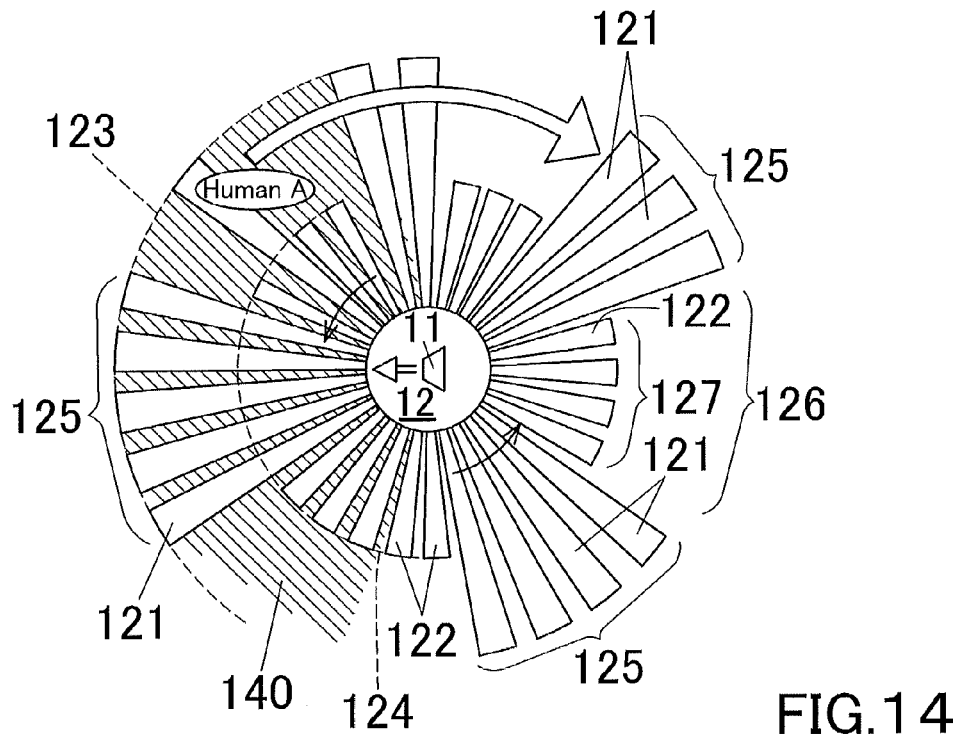
FIG. 14 is a top view of a group of lenses constituting a pattern when a human body is moving coaxially with the sensor within the sensing zone of the sensor.

FIG. 14 is to explain the algorithm to recognize that a human body is moving coaxially with the sensor 11 as indicated by a thick white arrow stretching from the human body, within the first sensing zone 123 of the sensor 11.

Figure 15A:
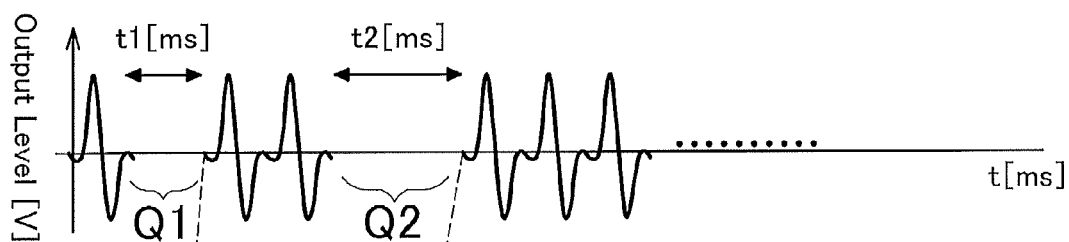
FIG. 15A is a view illustrating a waveform indicated by the sensor when a human body is taking a pause within the sensing zone of the sensor.
Figure 15B:
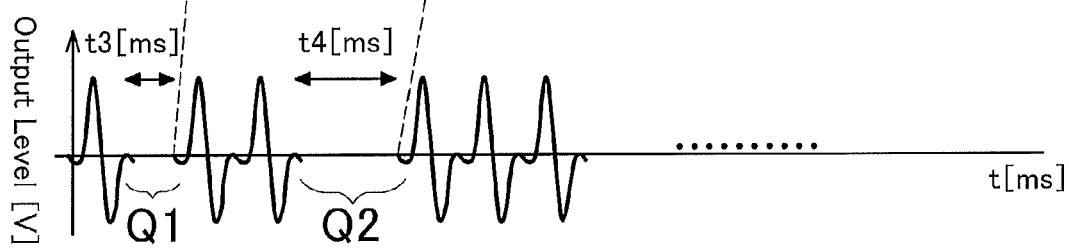
FIG. 15B is a view illustrating a waveform indicated by the sensor when a human body is moving coaxially with the sensor.

When the human body A is taking a pause, the sensor 11 indicates the waveform of FIG. 15A which is similar to that of FIG. 11A. When the human body A is moving coaxially with the sensor 11 in the negative rotation direction of the group of lenses 12, the sensor 11 indicates the waveform of FIG. 15B; it takes less time to complete one cycle of the waveform than in FIG. 15A while the cycles related to the first regional sensing zones 125 stay at the same output level as the waveform of FIG. 15A while because the human body A is moving at a certain speed. In other words, the inactive periods Q1 and Q2 in FIG. 15B are shorter than those in FIG. 15A. For example, the inactive periods Q1 and Q2 are the times t1 and t2 in the waveform of FIG. 15A and the times t3 and t4 (t3<t1; t4<t2) in the waveform of FIG. 15B. On the other hand, when the human body A is moving coaxially with the sensor 11 in the positive rotation direction of the group of lenses 12, it takes more time to complete one cycle of the waveform than in FIG. 15A while the cycles related to the first regional sensing zones 125 stay at the same output level as the waveform of FIG. 15A.

In the way as described above, the direction that the human body A is moving to is determined based on whether more or less time it takes to complete one cycle of the waveform than in FIG. 15A.

The distance of the sensor 11 to the human body A which is detected in the first sensing zone 123 and the direction that this human body A is moving to can be determined in the same way as described above with reference to the examples of FIGS. 11 and 12.

Figure 16:
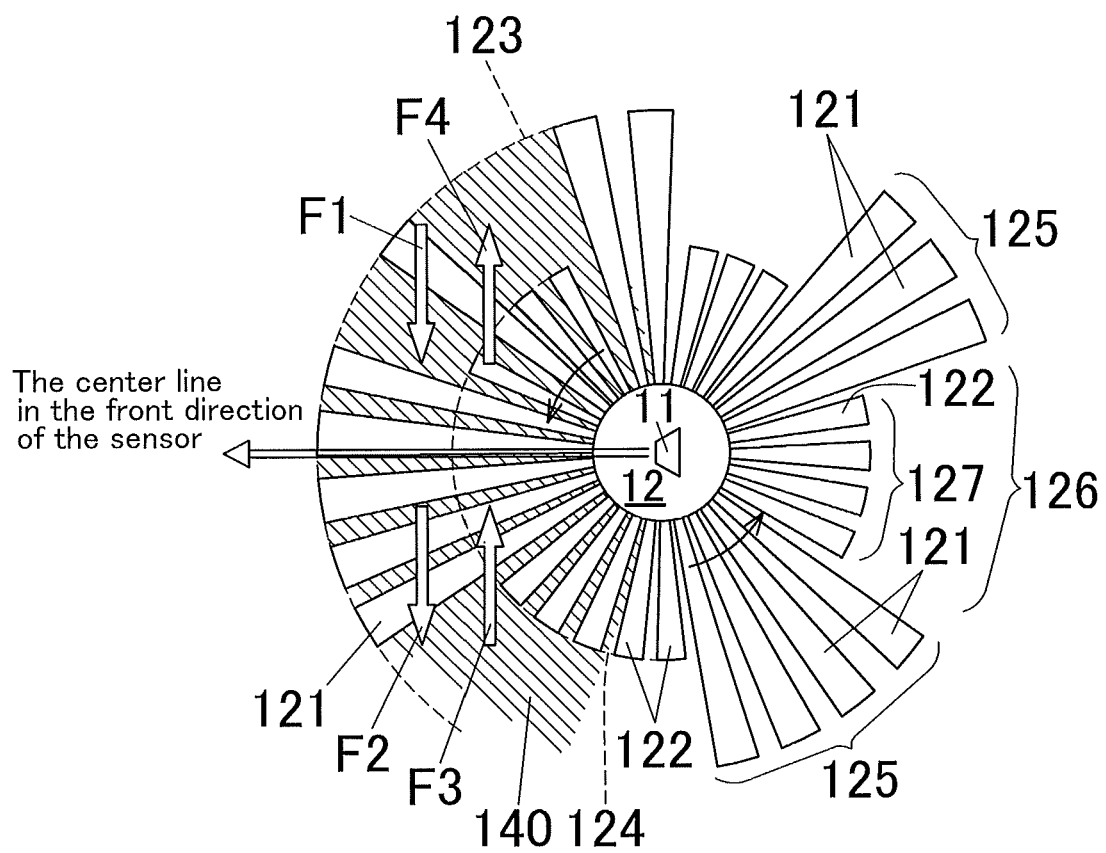
FIG. 16 is a top view of a group of lenses constituting a pattern when a human body is moving straight within the sensing zone of the sensor.

FIG. 16 is to explain the algorithm to recognize that a human body is moving straight within the first sensing zone 123 of the sensor 11. The algorithm is based on the case that the human body A is moving at a right angle to the center line in the front direction of the sensor 11; the same algorithm also holds true even for the other case that the human body A is moving at an oblique angle to the center line in the front direction of the sensor 11.

For example, when the human body A is moving in the direction indicated by a thick white arrow F1, it takes more time to complete one cycle of the waveform while the output level of the cycles related to the first regional sensing zones 125 becomes higher, because it means that the distance of the sensor 11 to the human body A gradually becomes shorter.

For example, when the human body A is moving in the direction indicated by a thick white arrow F2, it takes more time to complete one cycle of the waveform while the output level of the cycles related to the first regional sensing zones 125 becomes lower, because it means that the distance of the sensor 11 to the human body A gradually becomes longer.

For example, when the human body A is moving in the direction indicated by a thick white arrow F3, it takes less time to complete one cycle of the waveform while the output level of the cycles related to the first regional sensing zones 125 becomes higher, because it means that the distance of the sensor 11 to the human body A gradually becomes shorter.

For example, when the human body A is moving in the direction indicated by a thick white arrow F4, it takes less time to complete one cycle of the waveform while the output level of the cycles related to the first regional sensing zones 125 becomes lower, because it means that the distance of the sensor 11 to the human body A gradually becomes longer.

In this way as described above, the direction that the human body is moving to is determined based on the combined factors: the output level of the cycles related to the first regional sensing zones 125 and the time required to complete one cycle of the waveform. FIG. 17 is a table including the results of the four cases described above.

The distance of the sensor 11 to the human body A which is detected in the first sensing zone 123 and the direction that this human body A is moving to can be determined in the same way as described above with reference to the examples of FIGS. 11 and 12.

By the way, there are possibilities that a human body which has been detected cannot be later detected. More specifically, a human body which is detected in the first sensing zone 123 of the sensor 11 may get out of the first sensing zone 123 or may be moving at the same speed as the rotation speed of the group of lenses 12. It is inconvenient that a human body which is definitely in the first sensing zone 123 of the sensor 11 fails to be detected when moving at the same speed as the rotation speed of the group of lenses 12.

In order to resolve the inconvenience, there is a need to make a difference in speed between the motion of the human body and the rotation of the group of lenses 12; it is preferred that a rotary condition of the group of lenses 12 should be changed. Specifically, it is most preferred that the group of lenses 12 should be rotated in the opposite direction, stopped rotating, or rotated at a higher or lower speed.

Figure 18:
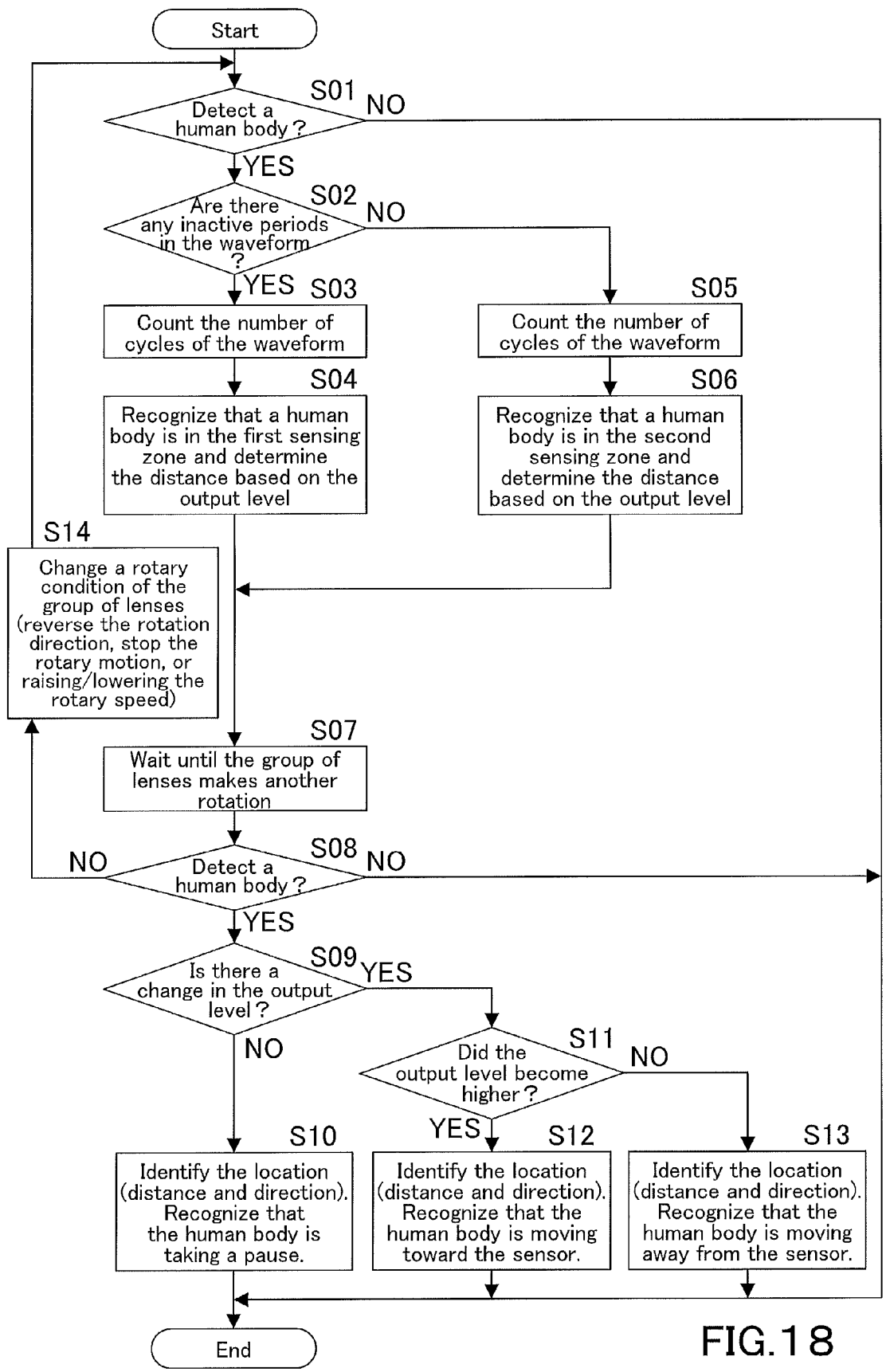
FIG. 18 is a flowchart representing a human body sensing operation to be performed under a different rotary condition of the group of lenses.

FIG. 18 is a flowchart representing a human body sensing operation to be performed under a different rotary condition of the group of lenses 12. The procedure is executed by the CPU 121 according to an operation program stored on the program ROM 152 or another recording medium.

It should be noted that the explanation of the Steps S01 to S13 will be omitted because these steps have already been described with reference to the flowchart of FIG. 13.

To start with Step S08 of the flowchart of FIG. 18, in which it is further judged whether or not a human body is detected. If no human body is detected (NO in Step S08), a rotary condition of the group of lenses 12 is changed in Step S14, and then the processing routine returns to Step S01 to further judge whether or not a human body is detected.

Hereinafter, another mode of implementing the present invention will be described.

When a human body is detected very close to the sensor 11, it is highly possible that this is a user who is about to use the image forming apparatus 2. In such a situation, the image forming apparatus 2 identifies the location of the human body accurately in an earlier stage, then if need, exits sleep mode to get back to normal operation mode as soon as possible.

In this mode of implementation, when a human body is detected in the first sensing zone 123, the group of lenses 12 is rotated at a higher speed than that when no human body is detected in the first sensing zone 123; and when a human body is further detected in the second sensing zone 124 with a shorter sensing distance than that of the first sensing zone 123, the group of lenses 12 is rotated at a higher speed than that when a human body is detected in the first sensing zone 123. Here, rotating the group of lenses 12 at a higher speed in this way above makes it possible to identify the location of the human body accurately in an earlier stage.

Figure 19:
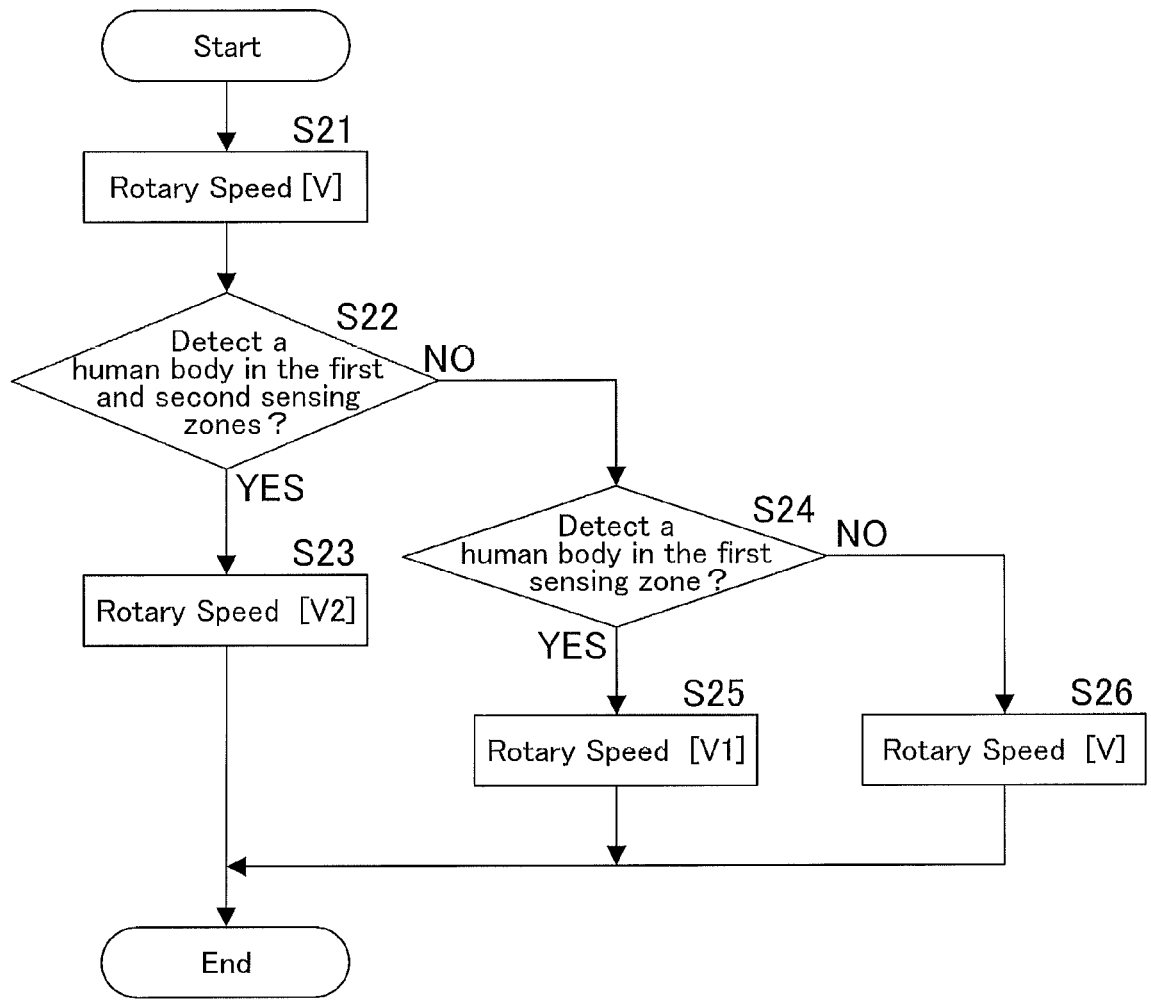
FIG. 19 is a flowchart representing an operation to change the rotation speed of the group of lenses.

FIG. 19 is a flowchart representing an operation to change the rotary speed of the group of lenses 12.

In Step S21, the rotary speed of the group of lenses 12 is set to V. And it is judged in Step S22, whether or not a human body is detected in the first sensing zone 123 and the second sensing zone 124. If a human body is detected both in the first sensing zone 123 and the second sensing zone 124 (YES in Step S22), the rotary speed of the group of lenses 12 is set to V2 in Step S23. If no human body is detected neither in the first sensing zone 123 nor in the second sensing zone 124 (NO in Step S22), then it is judged in Step S24 whether or not a human body is detected in the first sensing zone 123. If a human body is detected in the first sensing zone 123 (YES in Step S24), the rotary speed of the group of lenses 12 is set to V1 in Step S25. If no human body is detected in the first sensing zone 123 (NO in Step S24), the rotary speed of the group of lenses 12 is kept as is. Here, the rotary speed values should be larger in the following order: V<V1<V2.

Hereinafter, yet another mode of implementing the present invention will be described.

In this mode of implementation, the width of the non-sensing zones 126 in a rotation direction of the group of lenses 12 becomes larger with distance from the group of lenses 12; and the width of the tiny non-sensing zones 128 (illustrated in FIG. 3) in a rotation direction of the group of lenses 12, which are caused by a tiny space interval between the lenses and formed between the first unit sensing zones 121, also becomes larger with distance from the group of lenses 12. And by rotating the group of lenses 12 at a higher speed, the location of a human body which is detected at a location still away from the sensor 11 in the first sensing zone 123, can be identified in an earlier stage. This mode of implementation is preferred when there is a need to identify the location of a human body which is even far away from the sensor 11, accurately, for example when there is a need to take care of data security.

The flowchart representing an operation to change the rotary speed of the group of lenses 12, which is illustrated in FIG. 19, also may be used in this mode of implementation. However, the rotary speed values are not the same; these should be larger in the following order: V<V2<V1.

Some modes of implementing the present invention have been described in the foregoing specification, which does not mean that the present invention shall be construed as limited to the particular forms disclosed.

For example, as well as the first regional sensing zones 125, the second regional sensing zones 127 with a shorter sensing distance than that of the first regional sensing zones 125 are also formed in these modes of implementation. Alternatively, the second regional sensing zones 127 may not be also formed.

And alternatively, the first sensing zone 123 and the second sensing zone 124 may be formed under the effect of a plurality of alternating layers of a first unit sensing zone 121 defined by a long sensing distance and a second unit sensing zone 122 defined by a short sensing distance, which are formed in a rotation direction of the group of lenses 12.

Also for example, the human body sensing device 1 is installed on the image forming apparatus 2 in these modes of implementation. Alternatively, the human body sensing device 1 may be installed on an apparatus other than the image forming apparatus 2 or may be mounted on a wall or the like in office.

It is an advantage of installing the human body sensing device 1 on the image forming apparatus 2 that the image forming apparatus 2 can go into normal operation mode or sleep mode in a quick manner depending on the exact location of a human body by switching the power ON or OFF.

The present invention of the subject application having been described above may be applied to the following modes.

[1] A human body sensing device comprising:
an infrared sensor which detects a human body based on a change in infrared energy;
a rotatable group of lenses consisting of a plurality of first lenses arranged around the infrared sensor in a circular pattern, the first lenses being configured to:

generate first unit sensing zones defined by a first sensing distance extending radially outwardly from the group of lenses and a small width extending in a rotation direction of the group of lenses; and form a plurality of alternating layers of a first regional sensing zone including one or more than one of the first unit sensing zones and a non-sensing zone not including any of the first unit sensing zones, in a rotation direction of the group of lenses;

a rotary drive which rotates the group of lenses about the axis of the infrared sensor;

a rotation position sensor which detects a rotation position of the group of lenses rotated by the rotary drive; and a recognizer which recognizes the location and/or movement of a human body which is in a first sensing zone defined by the first sensing distance, extending radially outwardly from the group of lenses, based on the output level indicated by the infrared sensor while the group of lenses is being rotated by the rotary drive and the rotation position detected by the rotation position sensor.

[2] The human body sensing device as recited in the aforementioned item [1], wherein:

the group of lenses further includes a plurality of second lenses, the second lenses being configured to:

generate second unit sensing zones defined by a second sensing distance shorter than the first sensing distance, extending radially outwardly from the group of lenses and a small width extending in a rotation direction of the group of lenses;

form second regional sensing zones each including one or more than one of the second unit sensing zones, in the non-sensing zones; and further form a second sensing zone defined by the second sensing distance, extending radially outwardly from the group of lenses.

[3] A human body sensing device comprising:

an infrared sensor which detects a human body based on a change in infrared energy;

a rotatable group of lenses consisting of a plurality of first and second lenses arranged around the infrared sensor in a mixed manner in a circular pattern, the first lenses being configured to generate first unit sensing zones defined by a first sensing distance extending radially outwardly from the group of lenses and a small width extending in a rotation direction of the group of lenses, while the second lenses generate second unit sensing zones defined by a second sensing distance shorter than the first sensing distance, extending radially outwardly from the group of lenses and a small width extending in a rotation direction of the group of lenses;

a rotary drive which rotates the group of lenses about the axis of the infrared sensor; and a recognizer which recognizes the location and/or movement of a human body which is in a first sensing zone defined by the first sensing distance, extending radially outwardly from the group of lenses, or in a second sensing zone defined by the second sensing distance, based on the output level indicated by the infrared sensor while the group of lenses is being rotated by the rotary drive.

[4] The human body sensing device as recited in the aforementioned item [1] or [2], wherein the first regional sensing zones include certain numbers of the first unit sensing zones, which are changed in a regular manner in a rotation direction of the group of lenses.

[5] The human body sensing device as recited in the aforementioned item [2] or [4], wherein the second regional sensing zones include certain numbers of the second unit sensing zones, which are changed in a regular manner in a rotation direction of the group of lenses.

[6] The human body sensing device as recited in the aforementioned item [4] or [5], wherein the certain numbers of the first unit sensing zones are changed in a regular manner in a rotation direction of the group of lenses, at least within the viewing angle of the infrared sensor.

[7] The human body sensing device as recited in any of the aforementioned items [4] to [6], wherein the certain numbers of the first unit sensing zones are increased in a regular manner in a rotation direction of the group of lenses.

[8] The human body sensing device as recited in any of the aforementioned items [1] to [7], wherein the recognizer recognizes that a human body is moving toward or away from the infrared sensor, based on a change in the output level of the infrared sensor.

[9] The human body sensing device as recited in any of the aforementioned items [1] to [8], wherein if the time required to complete one cycle of the waveform related to the first regional sensing zones is changed while the output level of the infrared sensor is kept unchanged, the recognizer recognizes that a human body is moving coaxially with the infrared sensor, within the sensing zone of the infrared sensor.

[10] The human body sensing device as recited in any of the aforementioned items [1] to [8], wherein if the time required to complete one cycle of the waveform related to the first regional sensing zones is changed while the output level of the infrared sensor is also changed, the recognizer recognizes that a human body is moving straight within the sensing zone of the infrared sensor.

[11] The human body sensing device as recited in any of the aforementioned items [1], [2], and [4] to [10], wherein if the recognizer recognizes that a human body has left the location where it had been detected at the last rotation of the group of lenses, the rotary drive changes a rotary condition of the group of lenses.

[12] The human body sensing device as recited in the aforementioned item [11], wherein changing the rotary condition means reversing the rotation direction, stopping the rotary motion, or changing the rotary speed of the group of lenses.

[13] The human body sensing device as recited in any of the aforementioned items [2] to [12], if the infrared sensor detects a human body in any of the first regional sensing zones and another human body in any of the second regional sensing zones at the same time, the recognizer preferentially recognizes the location and/or movement of the human body which is detected in the second regional sensing zone.

[14] The human body sensing device as recited in any of the aforementioned items [2] to [13], wherein: the rotary drive sets the rotary speed of the group of lenses to a value V if the infrared sensor detects no human body in the first sensing zone; the rotary drive sets the rotary speed of the group of lenses to a value V1 if the infrared sensor detects a human body in the first sensing zone but not in the second sensing zone; the rotary drive sets the rotary speed of the group of lenses to a value V2 if the infrared sensor detects a human body in the second sensing zone; and the values should be larger in the following order: V<V1<V2.

[15] The human body sensing device as recited in any of the aforementioned items [2] to [13], wherein: the rotary drive sets the rotary speed of the group of lenses to a value V if the infrared sensor detects no human body in the first sensing zone; the rotary drive sets the rotary speed of the group of lenses to a value V1 if the infrared sensor detects a human body in the first sensing zone but not in the second sensing zone; the rotary drive sets the rotary speed of the group of lenses to a value V2 if the infrared sensor detects a human body in the second sensing zone; and the values should be larger in the following order: V<V2<V1.

[16] An image forming apparatus comprising the human body sensing device as recited in any of the aforementioned items [1] to [15].

According to the mode of implementing the present invention as recited in the aforementioned item [1], a group of lenses comprises a plurality of first lenses arranged in a circular pattern around an infrared sensor which detects a human body based on a change in infrared energy. First unit sensing zones are generated by the first lenses, and a plurality of alternating layers of a first regional sensing zone including one or more than one of the first unit sensing zones and a non-sensing zone not including any of the first unit sensing zones are formed in a rotation direction of the group of lenses. This makes it possible to identify the location of a human body, i.e. in which of the first regional sensing zones a human body is detected, accurately based on the rotation position of the group of lenses and the sensor output, and also identify the movement of a human body which is in the sensing zone of the infrared sensor, accurately based on a change of the sensor output related to the first regional sensing zones.

According to the mode of implementing the present invention as recited in the aforementioned item [2], second regional sensing zones including second unit sensing zones defined by a shorter sensing distance than that of the first lenses are formed in the non-sensing zones. This makes it possible to detect a human body accurately based on the sensor output related to the second regional sensing zones, even if the human body further moves closer to the infrared sensor.

According to the mode of implementing the present invention as recited in the aforementioned item [3], a first sensing zone defined by a first sensing distance and a second sensing zone defined by a second sensing distance which is shorter than the first sensing distance are formed radially outwardly from the group of lenses. This makes it possible to detect a human body more accurately based on the sensor output related to the first unit sensing zones and the same related to the second unit sensing zones, even if the human body moves toward the infrared sensor and even if the human body further moves closer to the infrared sensor, respectively.

According to the mode of implementing the present invention as recited in the aforementioned item [4], the first regional sensing zones include the first unit sensing zones whose numbers are changed in a regular manner in a rotation direction of the group of lenses, so that the sensor output can be changed in a regular manner depending on the number of the first unit sensing zones included in one first regional sensing zone, when a human body is detected. This makes it possible to identify the location and/or movement of a human body more accurately based on a change of the sensor output.

According to the mode of implementing the present invention as recited in the aforementioned item [5], the second regional sensing zones include certain numbers of the second unit sensing zones, which are changed in a regular manner in a rotation direction of the group of lenses, so that the sensor output can be changed in a regular manner depending on the number of the second unit sensing zones included in one second regional sensing zone, when a human body is detected. This makes it possible to identify the location and/or movement of a human body more accurately based on a change of the sensor output.

According to the mode of implementing the present invention as recited in the aforementioned item [6], the certain numbers of the first unit sensing zones are changed in a regular manner in a rotation direction of the group of lenses, at least within the viewing angle of the infrared sensor, which makes it possible to identify the location and/or movement of a human body accurately.

According to the mode of implementing the present invention as recited in the aforementioned item [7], the certain numbers of the first unit sensing zones are increased in a regular manner in a rotation direction of the group of lenses, which makes it possible to identify the location and/or movement of a human body accurately based on a change of the sensor output.

According to the mode of implementing the present invention as recited in the aforementioned item [8], it is recognized that a human body is moving toward or away from the infrared sensor, based on a change of the output level of the infrared sensor.

According to the mode of implementing the present invention as recited in the aforementioned item [9], if the time required to complete one cycle of the waveform related to the first regional sensing zones becomes shorter or longer gradually while the output level of the infrared sensor is not changed, it is recognized that a human body is moving coaxially with the infrared sensor within the sensing zone of the infrared sensor.

According to the mode of implementing the present invention as recited in the aforementioned item [10], if the time required to complete one cycle of the waveform related to the first regional sensing zones becomes shorter or longer gradually while the output level of the infrared sensor is changed also gradually, it is recognized that a human body is moving straight within the sensing zone of the infrared sensor.

According to the mode of implementing the present invention as recited in the aforementioned item [11], if it is recognized that a human body has left the location where it had been detected at the last rotation of the group of lenses, a rotary condition of the group of lenses is changed, which makes it possible to detect a human body in the sensing zone of the infrared sensor accurately, even if the human body is moving at the same speed as the rotary speed of the group of lenses.

According to the mode of implementing the present invention as recited in the aforementioned item [12], changing the rotary condition of the group of lenses is reversing the rotation direction, stopping the rotary motion, or changing the rotary speed of the group of lenses.

According to the mode of implementing the present invention as recited in the aforementioned item [13], if the infrared sensor detects a human body in any of the first regional sensing zones and another human body in any of the second regional sensing zones at the same time, the sensor output related to the second regional sensing zones with a shorter sensing distance than that of the first regional sensing zones, becomes dominant. This makes it possible to detect a human body more accurately.

According to the mode of implementing the present invention as recited in the aforementioned item [14], accelerating the rotary speed of the group of lenses leads to an increase in the number of times of identification processing per a certain period, which makes it possible to identify the location and/or movement of a human body in an earlier stage.

According to the mode of implementing the present invention as recited in the aforementioned item [15], the rotary speed of the group of lenses is accelerated when a human body entering the sensing zone of the infrared sensor is detected in any of the first regional sensing zones, which makes it possible to identify the location and/or movement of a human body in an earlier stage.

According to the mode of implementing the present invention as recited in the aforementioned item [16], the image forming apparatus is allowed to detect a human body accurately even if the human body moves toward the image forming apparatus, and also identify the movement of a human body which is in the sensing zone of the infrared sensor accurately.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A human body sensing device comprising:
an infrared sensor which is configured to detect a change in infrared energy and produce an output waveform in response to the change;
a rotatable group of lenses including a plurality of first lenses arranged around the infrared sensor in a circular pattern, the first lenses being configured to:
generate first unit sensing zones defined by a first sensing distance extending radially outwardly from the group of lenses and a small width extending in a rotation direction of the group of lenses; and
form a plurality of alternating layers of a first regional sensing zone including one or more than one of the first unit sensing zones and a non-sensing zone not including any of the first unit sensing zones, in a rotation direction of the group of lenses;
a rotary drive which is configured to rotate the group of lenses about the axis of the infrared sensor;
a rotation position sensor which is configured to detect a rotation position of the group of lenses rotated by the rotary drive; and
a recognizer which is configured to recognize the location and/or movement of a human body which is in a first sensing zone defined by the first sensing distance, extending radially outwardly from the group of lenses, based on the output waveform from the infrared sensor, the output waveform being produced in conjunction with rotary movement of the group of lenses by the rotary drive, and the rotation position detected by the rotation position sensor.

2. The human body sensing device as recited in claim 1, wherein:
the group of lenses further includes a plurality of second lenses, the second lenses being configured to:
generate second unit sensing zones defined by a second sensing distance shorter than the first sensing distance, extending radially outwardly from the group of lenses and a small width extending in a rotation direction of the group of lenses;
form second regional sensing zones each including one or more than one of the second unit sensing zones, in the non-sensing zones; and
further form a second sensing zone defined by the second sensing distance, extending radially outwardly from the group of lenses.

3. The human body sensing device as recited in claim 2, wherein the second regional sensing zones include certain numbers of the second unit sensing zones, which are changed in a regular manner in a rotation direction of the group of lenses.

4. The human body sensing device as recited in claim 2, wherein the infrared sensor is configured to detect changes in infrared energy both in any of the first regional sensing zones and in any of the second regional sensing zones at the same time, and the recognizer is configured to preferentially recognize the location and/or movement of the human body on the basis of an output caused by the change in infrared energy, the change being detected in the second regional sensing zone.

5. The human body sensing device as recited in claim 2, wherein: the rotary drive is configured to set a rotary speed of the group of lenses to a value V if the infrared sensor detects no human body in the first sensing zone; the rotary drive is configured to set the rotary speed of the group of lenses to a value V1 if the infrared sensor detects a human body in the first sensing zone but not in the second sensing zone; the rotary drive is configured to set the rotary speed of the group of lenses to a value V2 if the infrared sensor detects a human body in the second sensing zone; and the rotary drive is configured to set the values to be larger in the following order: V<V1<V2.

6. The human body sensing device as recited in claim 2, wherein: the rotary drive is configured to set a rotary speed of the group of lenses to a value V if the infrared sensor detects no human body in the first sensing zone; the rotary drive is configured to set the rotary speed of the group of lenses to a value V1 if the infrared sensor detects a human body in the first sensing zone but not in the second sensing zone; the rotary drive is configured to set the rotary speed of the group of lenses to a value V2 if the infrared sensor detects a human body in the second sensing zone; and the rotary drive is configured to set the values to be larger in the following order: V<V2<V1.

7. The human body sensing device as recited in claim 1, wherein the first regional sensing zones include certain numbers of the first unit sensing zones, which are changed in a regular manner in a rotation direction of the group of lenses.

8. The human body sensing device as recited in claim 7, wherein the certain numbers of the first unit sensing zones are changed in a regular manner in a rotation direction of the group of lenses, at least within the viewing angle of the infrared sensor.

9. The human body sensing device as recited in claim 7, wherein the certain numbers of the first unit sensing zones are increased in a regular manner in a rotation direction of the group of lenses.

10. The human body sensing device as recited in claim 1, wherein the recognizer is configured to recognize that a human body is moving toward or away from the infrared sensor, based on a change in the output waveform from the infrared sensor.

11. The human body sensing device as recited in claim 1, wherein the recognizer is configured to determine if a time required to complete one cycle of the waveform becomes shorter or longer gradually while the output waveform from the infrared sensor is not changed, the one cycle corresponding to one rotation of the group of lenses, and if so the recognizer is configured to recognize that a human body is moving coaxially with the infrared sensor, within the first sensing zone of the infrared sensor.

12. The human body sensing device as recited in claim 1, wherein the recognizer is configured to determine if a time required to complete one cycle of the waveform becomes shorter or longer gradually while the output waveform from the infrared sensor is changed also gradually, the one cycle corresponding to one rotation of the group of lenses, and if so the recognizer is configured to recognize that a human body is moving straight within the first sensing zone of the infrared sensor.

13. The human body sensing device as recited in claim 1, wherein when the recognizer whether that a human body is not in the sensing zone at a rotation of the group of lenses after recognizing that a human body is in the sensing zone at a last rotation of the group of lenses, the rotary drive changes a rotary condition of the group of lenses.

14. The human body sensing device as recited in claim 13, wherein the rotary condition is one of reversing the rotation direction, stopping the rotary motion, and changing the rotary speed of the group of lenses.

15. A human body sensing device comprising:
   an infrared sensor which is configured to detect a change in infrared energy and produce an output waveform in response to the change;
   a rotatable group of lenses including a plurality of first and second lenses arranged around the infrared sensor in a mixed manner in a circular pattern, the first lenses being configured to generate first unit sensing zones defined by a fist sensing distance extending radially outwardly from the group of lenses and a small width extending in a rotation direction of the group of lenses, while the second lenses generate second unit sensing zones for the infrared sensor, the second unit sensing zones being defined by a second sensing distance shorter than the first sensing distance, the second sensing distance extending radially outwardly from the group of lenses and a small width extending in a rotation direction of the group of lenses;
   a rotary drive which is configured to rotate the group of lenses about the axis of the infrared sensor; and
   a recognizer which is configured to recognize the location and/or movement of a human body which is in a first sensing zone defined by the first sensing distance, extending radially outwardly from the group of lenses, or in a second sensing zone defined by the second sensing distance, based on the output waveform from the infrared sensor, the output waveform being produced in conjunction with rotary movement of the group of lenses by the rotary drive.

16. The human body sensing device as recited in claim 15, wherein the infrared sensor is configured to detect changes in infrared energy both in any of the first regional sensing zones and in any of the second regional sensing zones at the same time, and the recognizer is configured to preferentially recognize the location and/or movement of the human body on the basis of an output caused by the change in infrared energy, the change being detected in the second regional sensing zone.

17. The human body sensing device as recited in claim 15, wherein: the rotary drive is configured to set a rotary speed of the group of lenses to a value V if the infrared sensor detects no human body in the first sensing zone; the rotary drive is configured to set the rotary speed of the group of lenses to a value V1 if the infrared sensor detects a human body in the first sensing zone but not in the second sensing zone; the rotary drive is configured to set the rotary speed of the group of lenses to a value V2 if the infrared sensor detects a human body in the second sensing zone; and the rotary drive is configured to set the values to be larger in the following order: V<V1<V2.

18. The human body sensing device as recited in claim 15, wherein: the rotary drive is configured to set a rotary speed of the group of lenses to a value V if the infrared sensor detects no human body in the first sensing zone; the rotary drive is configured to set the rotary speed of the group of lenses to a value V1 if the infrared sensor detects a human body in the first sensing zone but not in the second sensing zone; the rotary drive is configured to set the rotary speed of the group of lenses to a value V2 if the infrared sensor detects a human body in the second sensing zone; and the rotary drive is configured to set the values to be larger in the following order: V<V2<V1.

19. An image forming apparatus comprising a human body sensing device, the human body sensing device being provided with:
   an infrared sensor which is configured to detect a change in infrared energy and produce an output waveform in response to the change;
   a rotatable group of lenses including a plurality of first lenses arranged around the infrared sensor in a circular pattern, the first lenses being configured to:
      generate first unit sensing zones defined by a first sensing distance extending radially outwardly from the group of lenses and a small width extending in a rotation direction of the group of lenses; and
      form a plurality of alternating layers of a first regional sensing zone including one or more than one of the first unit sensing zones and a non-sensing zone not including any of the first unit sensing zones, in a rotation direction of the group of lenses;
   a rotary drive which is configured to rotate the group of lenses about the axis of the infrared sensor;
   a rotation position sensor which is configured to detect a rotation position of the group of lenses rotated by the rotary drive; and a recognizer which is configured to recognize the location and/or movement of a human body which is in a first sensing zone defined by the first sensing distance, extending radially outwardly from the group of lenses, based on the output waveform from the infrared sensor, the output waveform being produced in conjunction with rotary movement of the group of lenses by the rotary drive, and the rotation position detected by the rotation position sensor.

* * * * *